US005937145A

United States Patent [19]

Garboden et al.

[11] Patent Number: 5,937,145

[45] Date of Patent: *Aug. 10, 1999

[54] METHOD AND APPARATUS FOR IMPROVING INK-JET PRINT QUALITY USING A JITTERED PRINT MODE

[75] Inventors: Mark Garboden; Jason Quintana, both of Vancouver, Wash.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/871,127

[22] Filed: Jun. 9, 1997

[51] Int. Cl.[6] .................................................... G06K 15/00

[52] U.S. Cl. ........................................... 395/105; 395/108

[58] Field of Search .................................... 395/101, 109, 395/105, 111, 107, 108, 102, 117; 347/10, 11, 12, 14, 16, 19, 133, 144, 236, 237, 104; 358/502, 298

[56] References Cited

U.S. PATENT DOCUMENTS

| | | | |
|---|---|---|---|
| 4,575,730 | 3/1986 | Logan et al. | 346/75 |
| 4,789,874 | 12/1988 | Majette et al. . | |
| 5,426,457 | 6/1995 | Raskin . | |
| 5,429,441 | 7/1995 | Schulz et al. | 400/124.04 |
| 5,598,201 | 1/1997 | Stodder et al. | 347/104 |

FOREIGN PATENT DOCUMENTS

| | | |
|---|---|---|
| 0622229 | 11/1994 | European Pat. Off. . |
| 0632405 | 1/1995 | European Pat. Off. . |
| 0738068 | 10/1996 | European Pat. Off. . |

OTHER PUBLICATIONS

Patent Abstract of Japan; JP 05 147268A (Murata Mach Ltd).

Patent Abstract of Japan; JP 58 199166A (Canon KK).

European Search Report for related EP Applicantion No. 98304426.4–2304; Dated Nov. 30, 1998.

*Primary Examiner*—Arthur G. Evans

[57] ABSTRACT

A computerized method for improving ink-jet print quality. A jittered print mode is instigated to scatter print errors having a cyclic cause, viz., patterns of visibly noticeable artifacts or dot arrangements caused by mechanical misalignments and vibrations and electrical tolerance variations that are cyclic in nature. A jitter of ink droplet firing time is intentionally introduced whereby printed dot placement is offset less than a dot diameter. The jitter algorithm is adaptable to a variety of implementation schemes.

15 Claims, 4 Drawing Sheets

LINE FEED ERROR=0.5
RANDOM CARRIAGE ERROR=±0

LINE FEED ERROR=0.5
RANDOM CARRIAGE ERROR=±0.25

LINE FEED ERROR=0.5
RANDOM CARRIAGE ERROR=±0.5

METHOD AND APPARATUS FOR IMPROVING INK-JET PRINT QUALITY USING A JITTERED PRINT MODE

BACKGROUND OF THE INVENTION

1. Field of the Invention

The present invention relates generally to ink-jet technology, more particularly to ink-jet print modes, and more specifically to varying ink dot placement to minimize cyclic print errors.

2. Description of Related Art

The art of ink-jet technology is relatively well developed. Commercial products such as computer printers, graphics plotters, copiers, and facsimile machines employ ink-jet technology for producing hard copy. The basics of this technology are disclosed, for example, in various articles in the *Hewlett-Packard Journal*, Vol . 36, No. 5 (May 1985), Vol. 39, No. 4 (August 1988), Vol. 39, No. 5 (October 1988), Vol. 43, No. 4 (August 1992), Vol. 43, No. 6 (December 1992) and Vol. 45, No.1 (February 1994) editions. Ink-jet devices are also described by W. J. Lloyd and H. T. Taub in *Output Hardcopy* [*sic*] *Devices*, chapter 13 (Ed. R. C. Durbeck and S. Sherr, Academic Press, San Diego, 1988).

Generally, ink-jet printing involves movement and position tracking of ink-jet pens scanned (X-axis) across a print medium while the print medium is stepped transversely (Y-axis) in order that ink drops can be fired onto the print medium (Z-axis). Row and column dot matrix manipulation is used to turn the drops of ink into alphanumeric characters or graphic image patterns. Pen tracking, both movement and position, is usually controlled by employing magnetic or optical transducers and encoders, such as a strip encoder scale cooperating with an encoder or detector transducing or reading scale divisions. An example of an ink-jet apparatus encoder system is disclosed in U.S. Pat. No. 4,789,874, by Majette et al. (assigned to the common assignee of the present invention) for a Single Channel Encoder System, incorporated herein by reference.

In ink-jet printing, both dot density—with the current state-of-the-art being true 720 dot-per-inch ("dpi")—and ink drop placement have improved such that near-photographic quality graphic prints are now a commercial reality. With the use of special papers, the difference between a photograph and an ink-jet print made from a digitized scan of the photograph is hard to discern. As ink drop volume decreases and dot density rises, dot placement accuracy must improve and errors are exacerbated. For example, in double-dot-always print modes where one drop of ink is supposed to land precisely on top of a previous dot, when the drop volume is, for example, 32 picoliters ("pl"), a slight offset of the second drop should still provide for overlap and a small printing defect. But, an 8 pl drop misalignment at the same dpi may miss the target picture element ("pixel") and will produce a very noticeable print artifact. Smaller volume drops may actually land side-by-side rather than dot-on-dot, or vice-versa. Multi-level color printing, requiring the precise mixing of cyan, magenta, and yellow drops being fired from different primitives of a print head nozzle plate have the same problem. Random print errors have been virtually eliminated by half-toning techniques, such as error diffusion and dithering, and by using a variety of print modes, such as dot-on-dot print modes, double-dot-always print modes, dot-shingling print modes, bi-directional, superpixel, checkerboard print modes, and a variety of other methodologies known in the art. The types of remaining, noticeable, print errors—those visible to the naked eye upon close inspection of a print—are generally attributable to cyclic, systematic errors.

Cyclic errors are caused by hardware tolerance limitations, printer vibrations, drive gear and belt tooth ripple effects, and the like, that cause print errors to line up and become visible, diminishing the quality of a print. For example, ink-jet pens ride in carriages mounted on a slider bar and are driven by belt drives to scan across a sheet of paper at high speed, firing the minuscule droplets of ink on the fly from a plurality of nozzles. Dot placement on the paper is affected by mechanical tolerances for the pen shapes, pen mounts, pen and carriage datums, carriage mount to the slider bar, belt to carriage couplings, drive motor commutations, paper transport mechanisms—both electrical and mechanical—mechanical vibration harmonics caused by the relative motions, and electrical power fluctuations, or ripples, in both the system power supply for the print head and for the drive motor and the paper feed motor. Dot placement is thus a function of both paper axis directionality deviations and scan axis directionality deviations.

The use of current random error correction techniques allows cyclic errors to pile up on top of each other and become even more apparent artifact patterns in a print. In other words, one tolerance being slightly off can cause print errors and those errors will be cyclic, lining up in the print and effecting its quality. This is demonstrated by FIG. 4A. In FIG. 4A, dot size is magnified several hundred times and a single line feed error is simulated at 0.5 dot row. Note particularly that the white spaces between dots line up to form distinct patterns that are highly visible.

In U.S. Pat. No. 5,426,457 (assigned to the common assignee of the present invention), Raskin discloses a Direction-Independent Encoder Reading; Position Leading and Delay, and Uncertainty to Improve Bidirectional Printing. In a bidirectional print mode, Raskin sets up an asymmetrical dot-on-dot, drop firing timing scheme such that drops lead or approach the target picture element ("pixel") from opposite directions during successive passes in order to improve dot position accuracy. In order to solve a mottling problem (too much ink in one location, a particularly significant problem when printing on transparencies where ink absorption is relatively low and dry time is relatively high), for unidirectional printing Raskin introduces a deliberate noise to back off of the accuracy created by the asymmetrical timing scheme. Col. 21: 11. 19–col. 23: 11. 35. However, in the overall methodology, cyclic errors can still be a problem.

Therefore, there is a need for methods and apparatus to print high density ink-jet dot matrix data where compensation is provided to minimize cyclic error patterning.

SUMMARY OF THE INVENTION

In its basic aspects, the present invention provides a computerized method for scattering cyclic print error in an ink-jet hard copy apparatus from at least one ink-jet print head having a plurality of ink drop firing nozzles scanned across a print medium while printing rows and columns of dots on said print medium. During a sweep of the print head wherein a plurality of ink drops are fired in dot matrix rows and columns during a predetermined section of the sweep, a varied alteration of time of ink drop firing is introduced during each the sweep such that each dot is shifted less than one dot width.

Another basic aspect of the present invention is an ink-jet hard copy apparatus, having an input for receiving a print medium; a carriage mounted for scanning across a received print medium; at least one ink-jet printing cartridge mounted in the carriage for firing ink drops onto the received print medium to create dots thereon; a mechanism for encoding movement and position of the cartridge during scanning across the received print medium; a general computer memory having a program for calculating time of firing of ink drops onto the received print medium and for jittering the firing of ink drops such that time of firing is shifted ± a predetermined amount.

Another basic aspect of the present invention is a general computer memory having a program for scattering ink-jet drop placement on print media. There is included a mechanism for determining the time it takes an ink-jet print head to travel during one movement and position encoding cycle; a mechanism for determining time of firing of each set of ink drops during a movement and position encoding cycle; and a mechanism for shifting the time of firing during scanning the print head across the print media such that ink drops land in a zone encompassing a target pixel center.

It is an advantage of the present invention that it provides an ink jet print mode that is useful in minimizing cyclic error patterning in an ink jet print.

It is another advantage of the present invention that it produces prints have consistent hue using printers of differing manufacturing tolerance and quality control.

It is a further advantage of the present invention that it produces prints where cyclic printing errors are randomized and thus less visually perceptible.

It is still another advantage of the present invention that it allows for dot placement to be varied in a controllable manner; introduced random error can have a normal, uniform, Gaussian, or the like, distribution function.

It is yet another advantage of the present invention that it provides reliably reproducible hard copy.

It is yet another advantage of the present invention that it is flexible, allowing for advances as well as delays.

Other objects, features and advantages of the present invention will become apparent upon consideration of the following explanation and the accompanying drawings, in which like reference designations represent like features throughout the drawings.

The drawings referred to in this specification should be understood as not being drawn to scale except if specifically noted.

DESCRIPTION OF THE PREFERRED EMBODIMENT

Reference is made now in detail to a specific embodiment of the present invention, which illustrates the best mode presently contemplated by the inventors for practicing the invention. Alternative embodiments are also briefly described as applicable.

Figure 1:
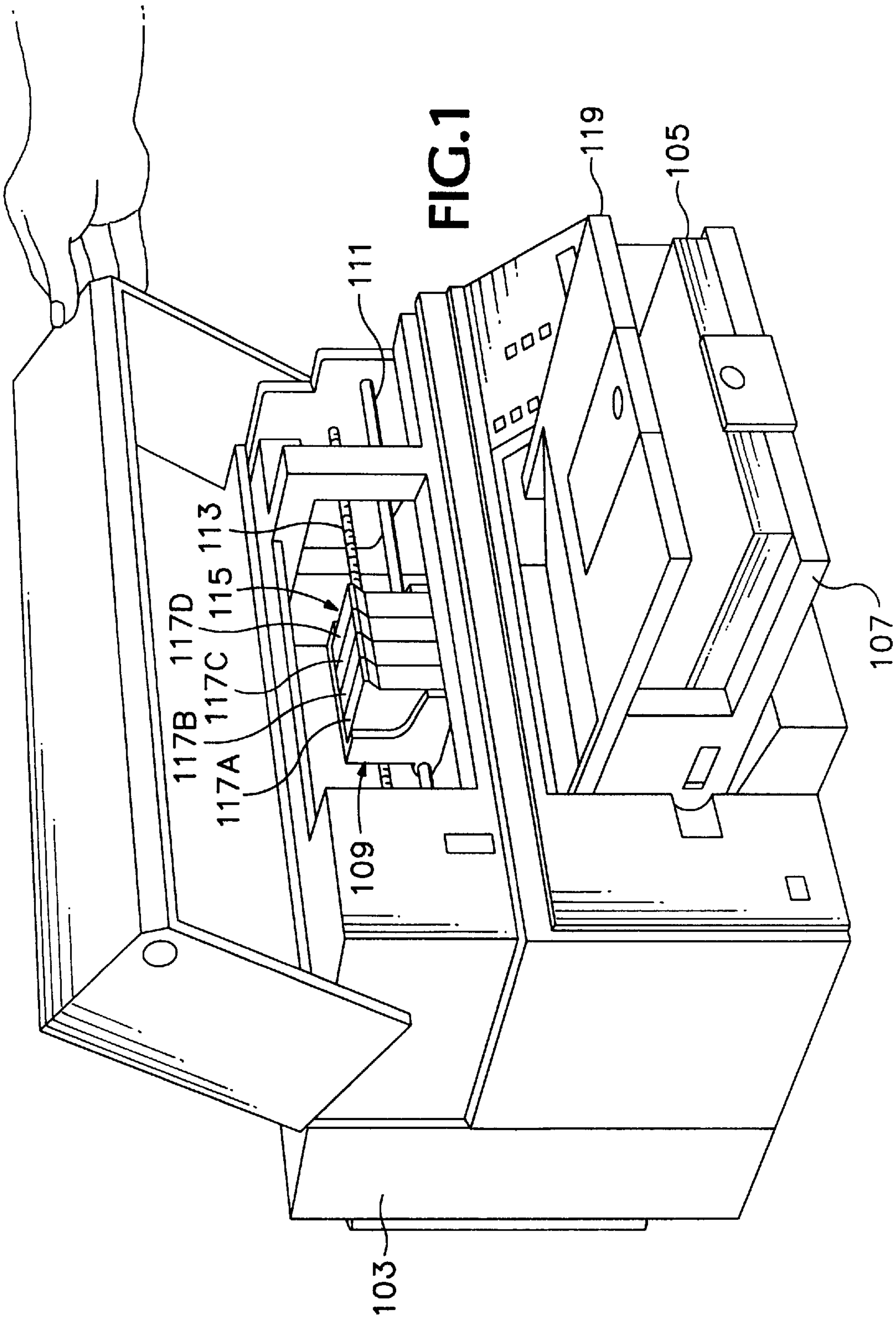
FIG. 1 is an exemplary ink-jet printer in which the present invention is incorporated.

As depicted in FIG. 1, an ink-jet printer 101 has a housing 103. Cut-sheet print media 105 (e.g., such as a glossy photo-print paper as might be used to make a copy of a digitized photograph) is loaded into an input tray 107. A scanning carriage 109 is mounted on a slider bar 111 and has a plurality of ink-jet print cartridges 117A–117D mounted in carriage holders 115 such that their respective print heads (not shown) are in proximity to a sheet of paper as it is transported along a paper path from the input tray 107 to a printing station within the housing 103 by paper feed mechanisms (not shown) that are well known in the art. Following printing, the sheet of paper is transported to the output tray 119. A strip encoder 113 mechanism is provided for keeping track of carriage 109, and hence print head(s), position during scanning. Generally, such printers have and on-board microprocessor or application specific integrated circuit ("ASIC") based electronic controller (not shown) for controlling all printing and print media feed processes and for interfacing the printer with a host, such as a personal computer, from which it receives print data.

In the basic aspects of the present invention, an extrapolater is used in conjunction with encoder pulses such that the timing for when drops of ink are fired relative to the lines on the encoder strip is varied. This may be done within a swath or by shifting each entire swath. Effectively, this actually adds dot placement errors to hide cyclic errors that would otherwise be present in the final print. Assume for the purpose of explaining the present invention that a 600 dot per inch print density is desired in order to obtain a near photo quality print.

Figure 2:
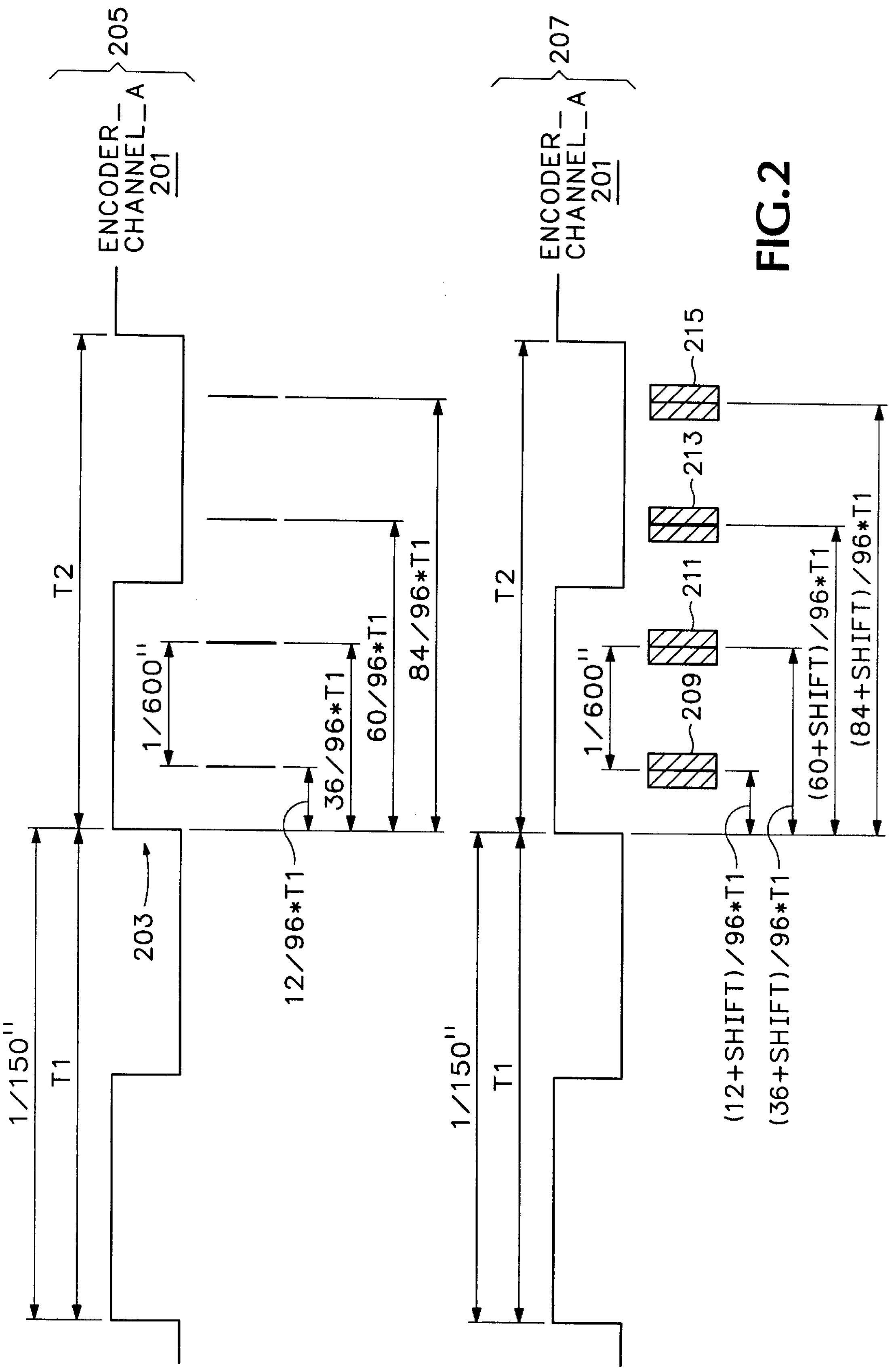
FIG. 2 is a timing diagram depicting the encoder timing based shifting of relative ink drop firing time in accordance with the method of the present invention as shown in FIG. 2.

As shown in FIG. 2, the encoder will provide a signal, ENCODER_CHANNEL_A 201, that is essentially a timing pulse train based on the sweep of the carriage 109 (FIG. 1) relative to the encoder strip 113. Assume for an exemplary embodiment that each ENCODER_CHANNEL_A 201 signal cycle, T1, T2, et seq., is generating a pulse train at 1/150th inch cycle and that a 600 dpi density is to be printed. The rising edge of each cycle is used to determine drop firing time. The speed of the carriage 109 (FIG. 1) as it sweeps across the paper is known and the time it takes to travel T1, 1/150 of an inch, can be calculated using the system clock. Constant carriage velocity is assumed. For a dot density of 600 dpi, four drops are fired during one ENCODER_CHANNEL_A 201 cycle. The process only uses one channel so that phase relationship can be ignored if a multichannel encoder is employed. Drop firing locations are determined by timing off of the "next" rising edge 203 of an encoder signal, starting T2. To equally space the ink drops, the pixel targets 1/600th inch firing times would be at:

{12/96×T1},
{36/96×T1},
{60/96×T1}, and
{84/96×T1} following rising edge 203 as shown in waveform 205. Other drop firing times for other encoders and dpi densities can be calculated in a likewise manner. However, such precision, as explained above, will not account for cyclic errors introduced into the print data.

Figure 3:
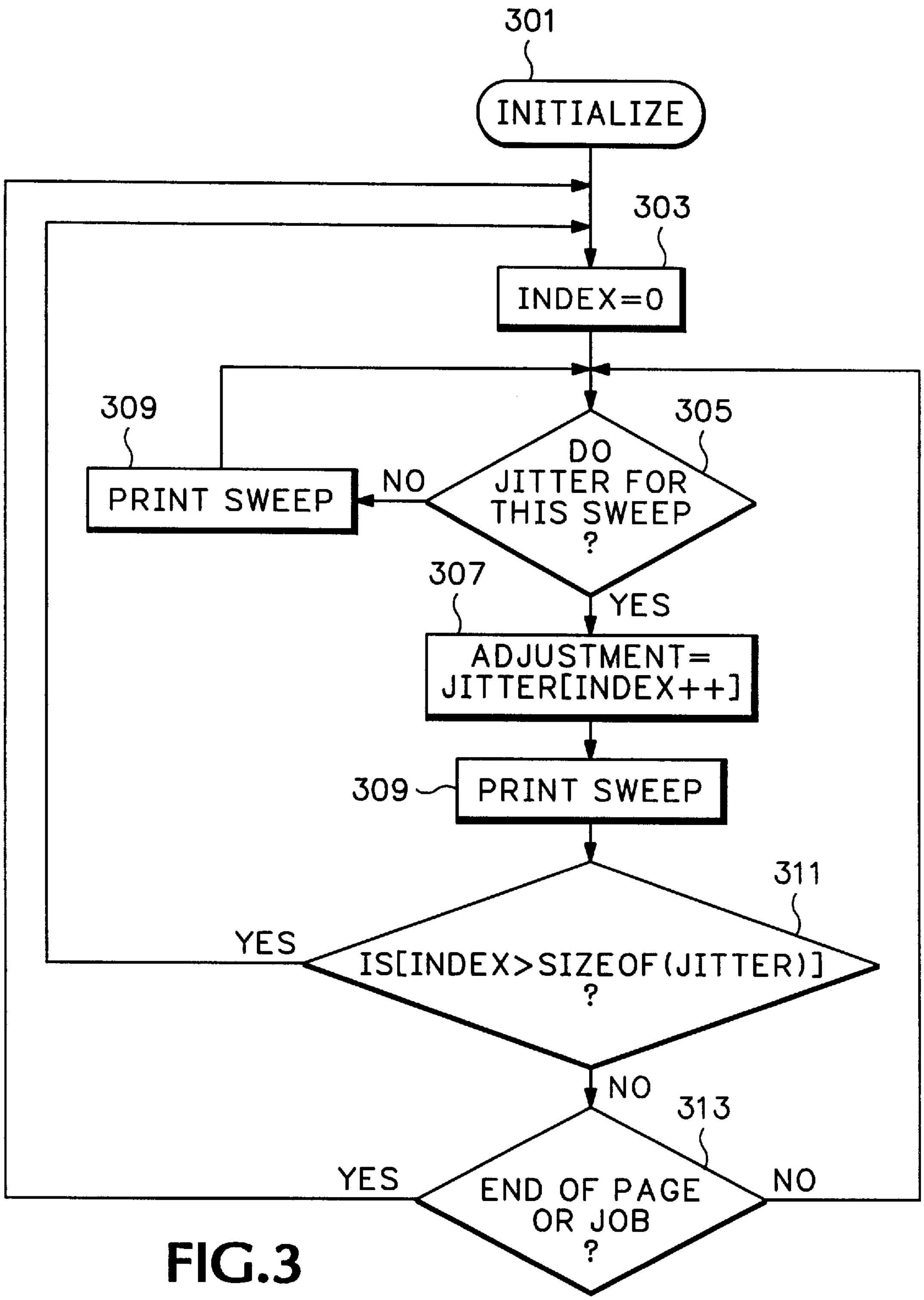
FIG. 3 is a flow chart of the methodology of the present invention.

Turning to FIG. 3, the process of introducing random error, or jitter, into the ink drop firing is shown. The method can be introduced in the form of a software printer driver routine or as part of the on-board firmware in the microprocessor or ASIC chip or by other techniques as would be common to the state of the art. A "jittered print mode" can be introduced with a soft switch in the printing application program, by a hard switch on the front panel, or automatically, depending on what form of printing (e.g., draft mode or best quality mode") the end user has selected.

The process is initialized 301 when the printer 101 (FIG. 1) is turned on and its on-board electronic controller is initialized. A drop firing jitter index count that will be used to change the firing time of each ink drop is provided and set, step 303, to a midpoint, in this example to zero.

For the purpose of this exemplary embodiment, assume a drop firing jitter index range of {0±3}, i.e., the jitter index can be −1, −2, −3, 0, +1, +2, +3. Once a print mode is selected, a decision is made, step 305, as to whether jittering is desired for the next sweep of the print cartridges 117A–117D (FIG. 1) across the page, step 309.

Assuming now that jittering has been selected [step 305=yes], the jitter index is incremented randomly, step 307. That is, a shift increment is added to the known time of ink drop firing. This is shown in waveform 207. For the next print sweep of the carriage 109 (FIG. 1), the pixel targets 1/600th inch firing times would be at:

{(12+index shift)/96×T1}

{(36+index shift)/96×T1}

{(60+index shift)/96×T1} and

{(84+index shift)/96×T1} following rising edge 203 as shown in waveform 207. Now, depending on the index shift introduced at step 307, a ink drop will be fired during the next print sweep 309 somewhere within the jittered target pixel firing time, represented by the hatched zones 209, 211, 213, 215.

After a sweep of the carriage 109 (FIG. 1) and in preparation for the next scan across the paper, a check of the jitter index is made to determine if another step increment will exceed the predetermined allowable range, step 311. Too much jitter would introduce noticeable error rather than a cyclic error correction factor. If so [step 311=yes], the jitter index is re-initialized to zero. In alternative embodiments, a complete random, a rule-based, a function-based, or the like, jitter index generator can be introduced in place of a simple incrementing scheme.

If the jitter index can be incremented, a check as to whether the end of the page or print job if multiple pages are being printed is performed, step 313. If so [step 313=yes], the process loops to the beginning, step 303. If not [313=no], the process loops the next sweep jitter determination, step 305.

It will be recognized by those skilled in the art that many nozzles of a print head are being fired. The algorithm could be extended to introduce jitter differently for different primitives. Moreover, by introducing a different jitter in each sweep, a drop from a particular nozzle that would have been targeted to land precisely on a drop from a previous sweep is slightly offset by having a different jitter factor. By introducing a different jitter each encoder cycle, an even greater compensation for cyclic error can be introduced. With a fast, completely varied index number generator, it is possible to introduce a different jitter index at each firing; in the present exemplary embodiment, four varied "jitters" per encoder cycle. The algorithm is automatically adjusted for bi-directional printing. Experimentation for any particular implementation can determine what specific jitter scheme provides the best visual results.

Figure 4A:
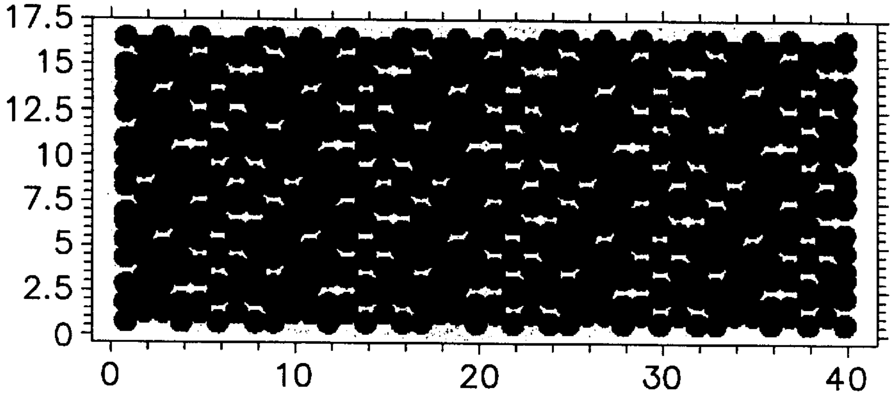
FIGS. 4A–4C are simulated comparison prints depicting in comparison effectiveness of the method of the present invention as shown in FIG. 2.
Figure 4B:
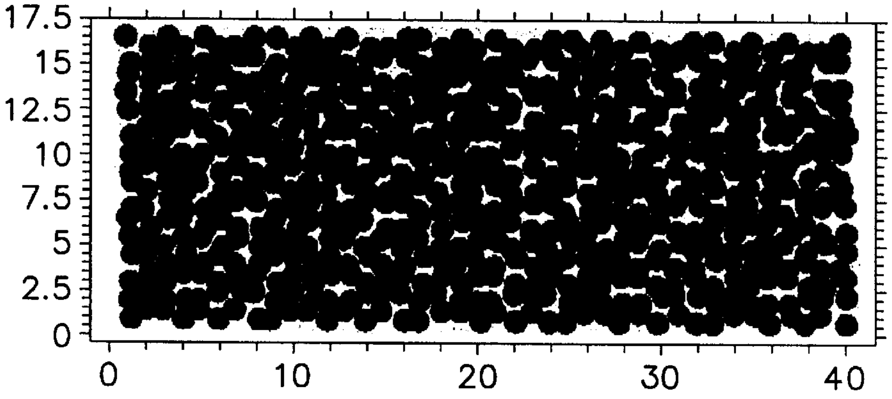
Figure 4C:
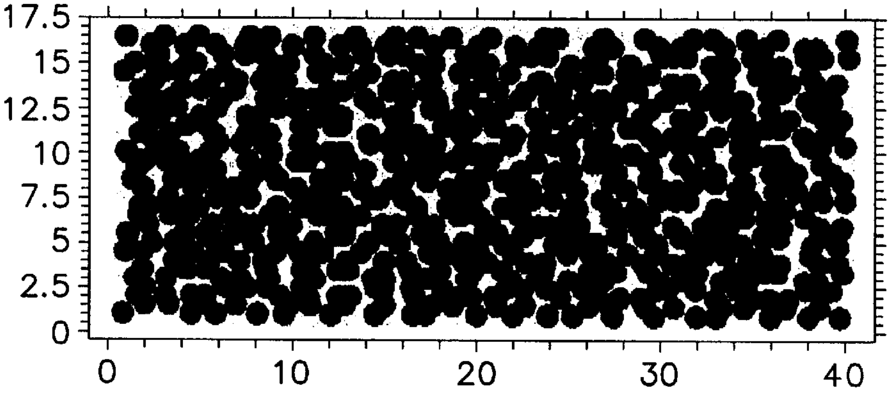

FIGS. 4A–4C demonstrates in comparison the variance of print errors in accordance with use of the present invention. FIG. 4A, explained above, shows a pattern of print errors—a white, inter-dot, spacing pattern—caused by a line feed error=0.5 dot row; a pattern that is easily picked up by the human visual system. FIG. 4B shows a print deposition where with the same line feed error, an introduction of a uniformly distributed, random, ±0.25 dot row jitter is introduced. While white spaces are still evident, it is not as apparent as a repeated pattern. FIG. 4C shows a print deposition where with the same line feed error, an introduction of a uniformly distributed, random, ±0.5 dot row jitter virtually makes the determination of an patterning of the white space error distinguishable. It has been found that a preferred jitter of about ±1/8th dot row produces the most reduction of patterning of cyclically introduced print errors.

Thus, the present invention presents an adaptable process for scattering cyclic print error problems in an ink-jet printer such that print quality is improved.

The foregoing description of the preferred embodiment of the present invention has been presented for purposes of illustration and description. It is not intended to be exhaustive or to limit the invention to the precise form or to exemplary embodiments disclosed. Obviously, many modifications and variations will be apparent to practitioners skilled in this art. Similarly, any process steps described might be interchangeable with other steps in order to achieve the same result. The embodiment was chosen and described in order to best explain the principles of the invention and its best mode practical application, thereby to enable others skilled in the art to understand the invention for various embodiments and with various modifications as are suited to the particular use or implementation contemplated. It is intended that the scope of the invention be defined by the claims appended hereto and their equivalents.

What is claimed is:

1. A computerized method for scattering cyclic print error in an ink-jet hard copy apparatus from at least one ink-jet print head having a plurality of ink drop firing nozzles scanned across a print medium while printing rows and columns of dots on said print medium, comprising the steps of:

during a sweep of said print head wherein a plurality of ink drops are fired in dot matrix rows and columns during a predetermined section of said sweep, introducing a varied alteration of time of ink drop firing during each said sweep such that each dot is shifted less than one dot width.

2. The method as set forth in claim 1, said step of introducing a varied alteration of time of firing further comprising the steps of:

determining time of firing of each ink drop during a print head position encoder cycle, introducing a varied selected shift to said time of firing.

3. The method as set forth in claim 2, said step of introducing a varying selected shift index further comprising the steps of:

introducing a selected shift of time of firing such that drop placement is shifted ±one-eighth dot row.

4. The method as set forth in claim 2, said step of introducing a varying selected shift index further comprising the steps of:

introducing a varying selected shift of time between each time of firing.

5. The method as set forth in claim 2, said step of introducing a varying selected shift index further comprising the steps of:

introducing a varying selected shift of time between each encoder cycle.

6. The method as set forth in claim 2, said step of introducing a varying selected shift index further comprising the steps of:

introducing a varying selected shift of time between each scan.

7. The method as set forth in claim 2, said step of iintroducing a varying selected shift index further comprising the steps of:

introducing a varying selected shift of time variedly during each scan.

8. An ink-jet hard copy apparatus, comprising:

an input for receiving a print medium;

a carriage mounted for scanning across a received print medium;

at least one ink-jet printing cartridge mounted in said carriage for firing ink drops onto said received print medium to create dots thereon;

means for encoding movement and position of said cartridge during scanning across said received print medium;

general computer memory means having a program for calculating time of firing of ink drops onto said received print medium and for jittering said firing of ink drops such that time of firing is shifted ±a predetermined amount.

9. The apparatus as set forth in claim 8, said program further comprising:

said predetermined amount produces a dot shift maximum of approximately one-eighth dot row.

10. The apparatus as set forth in claim 8, said program further comprising:

jittering using a timing jitter index generator.

11. The apparatus as set forth in claim 8, said program further comprising:

said time of firing is shifted said predetermined amount for each drop firing within an encoding cycle.

12. The apparatus as set forth in claim 8, said program further comprising:

said time of firing is shifted a different amount during each drop firing within an encoding cycle.

13. The apparatus as set forth in claim 8, said program further comprising:

said time of firing is shifted a different amount after each encoding cycle.

14. The apparatus as set forth in claim 8, said program further comprising:

following each scan of said received print medium.

15. A general computer memory having a program for scattering ink-jet drop placement on print media comprising:

means for determining the time it takes an ink-jet print head to travel during one movement and position encoding cycle;

means for determining time of firing of each set of ink drops during said one movement and position encoding cycle; and means for shifting the time of firing during scanning the print head across the print media such that ink drops land in a zone encompassing a target pixel center.

* * * * *